United States Patent
Schmidt et al.

(10) Patent No.: US 12,161,968 B2
(45) Date of Patent: Dec. 10, 2024

(54) ELECTROCHEMICAL CELL AND METHOD OF PROCESSING A GASEOUS STREAM CONTAINING HYDROGEN

(71) Applicant: Enapter S.r.l., Crespina Lorenzana (IT)

(72) Inventors: Jan-Justus Schmidt, Crespina Lorenzana (IT); Antonio Filpi, Crespina Lorenzana (IT); Sean Crawford Chapman, Crespina Lorenzana (IT); Lazarus Diamond, Crespina Lorenzana (IT); Daniele Procaccio, Crespina Lorenzana (IT); Alessandro Cappelletti, Crespina Lorenzana (IT)

(73) Assignee: Enapter S.r.l., Crespina Lorenzana (IT)

( * ) Notice: Subject to any disclaimer, the term of this patent is extended or adjusted under 35 U.S.C. 154(b) by 334 days.

(21) Appl. No.: 17/627,872

(22) PCT Filed: Jul. 27, 2020

(86) PCT No.: PCT/EP2020/071161
§ 371 (c)(1),
(2) Date: Jan. 18, 2022

(87) PCT Pub. No.: WO2021/018852
PCT Pub. Date: Feb. 4, 2021

(65) Prior Publication Data
US 2022/0274055 A1    Sep. 1, 2022

(30) Foreign Application Priority Data

Jul. 31, 2019  (GB) .................................. 1910939

(51) Int. Cl.
*B01D 53/32*   (2006.01)
*C25B 1/04*    (2021.01)
(Continued)

(52) U.S. Cl.
CPC .............. *B01D 53/326* (2013.01); *C25B 1/04* (2013.01); *C25B 9/23* (2021.01); *C25B 9/70* (2021.01);
(Continued)

(58) Field of Classification Search
CPC ........................ B01D 53/326; C25B 1/02–044
See application file for complete search history.

(56) References Cited

U.S. PATENT DOCUMENTS

| 4,593,534 A | 6/1986 | Bloomfield |
| 5,853,798 A * | 12/1998 | Dube ....................... B01J 31/30 |
| | | 427/125 |

(Continued)

FOREIGN PATENT DOCUMENTS

| GB | 2562580 A | 11/2018 |
| GB | 2576592 A | 2/2020 |

(Continued)

OTHER PUBLICATIONS

Vincent, I., et al., Low cost hydrogen production by anion exchange membrane electrolysis: A review, Renewable and Sustainable Energy Reviews, Jun. 28, 2017, vol. 81, pp. 1690-1704.

(Continued)

*Primary Examiner* — Hosung Chung
(74) *Attorney, Agent, or Firm* — Hodgson Russ LLP

(57) ABSTRACT

An electrochemical cell, or stack thereof, wherein each cell of the stack comprises at least: a membrane electrode assembly (MEA), the MEA comprising at least: an anode, a cathode, and an an-ion exchange membrane therebetween, an inlet to the anodic half-cell for the introduction of hydrogen at a first pressure, and an outlet from the cathodic half-cell for the transfer of hydrogen at a second pressure, and means to provide a required power to the cell. In one (Continued)

embodiment, the purification and compression of hydrogen occurring by utilisation of the following reaction pathway: formula (A) and formula (B).

$$H_2 + 2\,OH^- \longrightarrow 2\,H_2O + 2\,e^- \quad (I)$$
AEM Anode $$2\,H_2O + 2\,e^- \longrightarrow H_2 + 2\,OH^- \quad (II)$$
AEM Cathode

24 Claims, 9 Drawing Sheets

(51) Int. Cl.
*C25B 9/23* (2021.01)
*C25B 9/70* (2021.01)
*C25B 11/032* (2021.01)
*C25B 11/075* (2021.01)
*G01N 27/407* (2006.01)
*H01M 8/0662* (2016.01)

(52) U.S. Cl.
CPC .......... *C25B 11/032* (2021.01); *C25B 11/075* (2021.01); *G01N 27/407* (2013.01); *H01M 8/0681* (2013.01)

(56) References Cited

U.S. PATENT DOCUMENTS

| | | | |
|---|---|---|---|
| 9,186,624 B2 * | 11/2015 | Blanchet | H01M 8/0656 |
| 2001/0030127 A1 * | 10/2001 | Li | B01D 53/326 |
| | | | 205/633 |
| 2003/0062268 A1 | 4/2003 | Kosek et al. | |
| 2004/0040862 A1 | 3/2004 | Kosek et al. | |
| 2007/0246374 A1 * | 10/2007 | Eisman | C01B 3/50 |
| | | | 205/765 |
| 2010/0132386 A1 | 6/2010 | Bahar | |
| 2013/0292252 A1 | 11/2013 | Linder et al. | |
| 2014/0353169 A1 * | 12/2014 | Preston | H01M 8/0606 |
| | | | 204/661 |
| 2015/0344332 A1 | 12/2015 | Gu | |
| 2016/0208791 A1 | 7/2016 | Reeh et al. | |
| 2017/0082328 A1 | 3/2017 | Bahar | |
| 2017/0174800 A1 | 6/2017 | Isomura et al. | |
| 2018/0252668 A1 | 9/2018 | Bahar et al. | |
| 2018/0323442 A1 | 11/2018 | Dekel et al. | |

FOREIGN PATENT DOCUMENTS

| | | |
|---|---|---|
| KR | 1020150104474 A | 9/2015 |
| RU | 2624012 C1 | 6/2017 |
| WO | 2007/082898 A2 | 7/2007 |
| WO | 2011/004343 A1 | 1/2011 |
| WO | 2018195275 A1 | 10/2018 |

OTHER PUBLICATIONS

Grigoriev, S. A., et al., "Electrochemical hydrogen compressors/concentrators based on solid polymer electrolyte", Alternative Fuel Transport, Oct. 2011, No. 5, vol. 23, pp. 57-59.

* cited by examiner

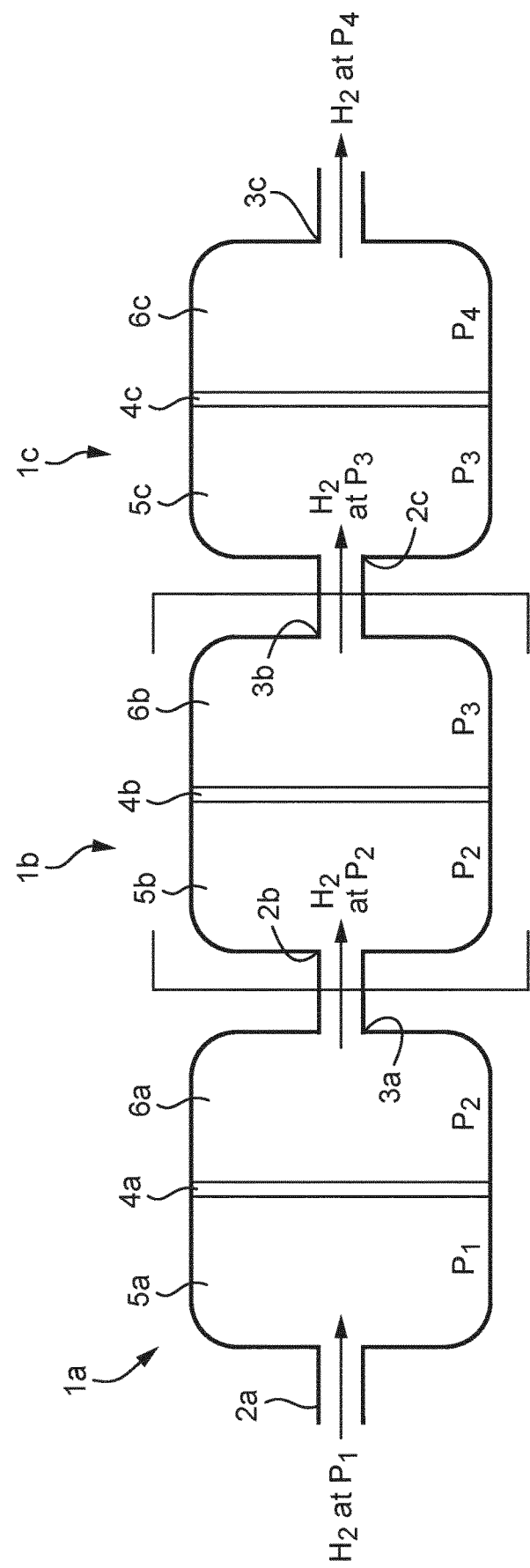

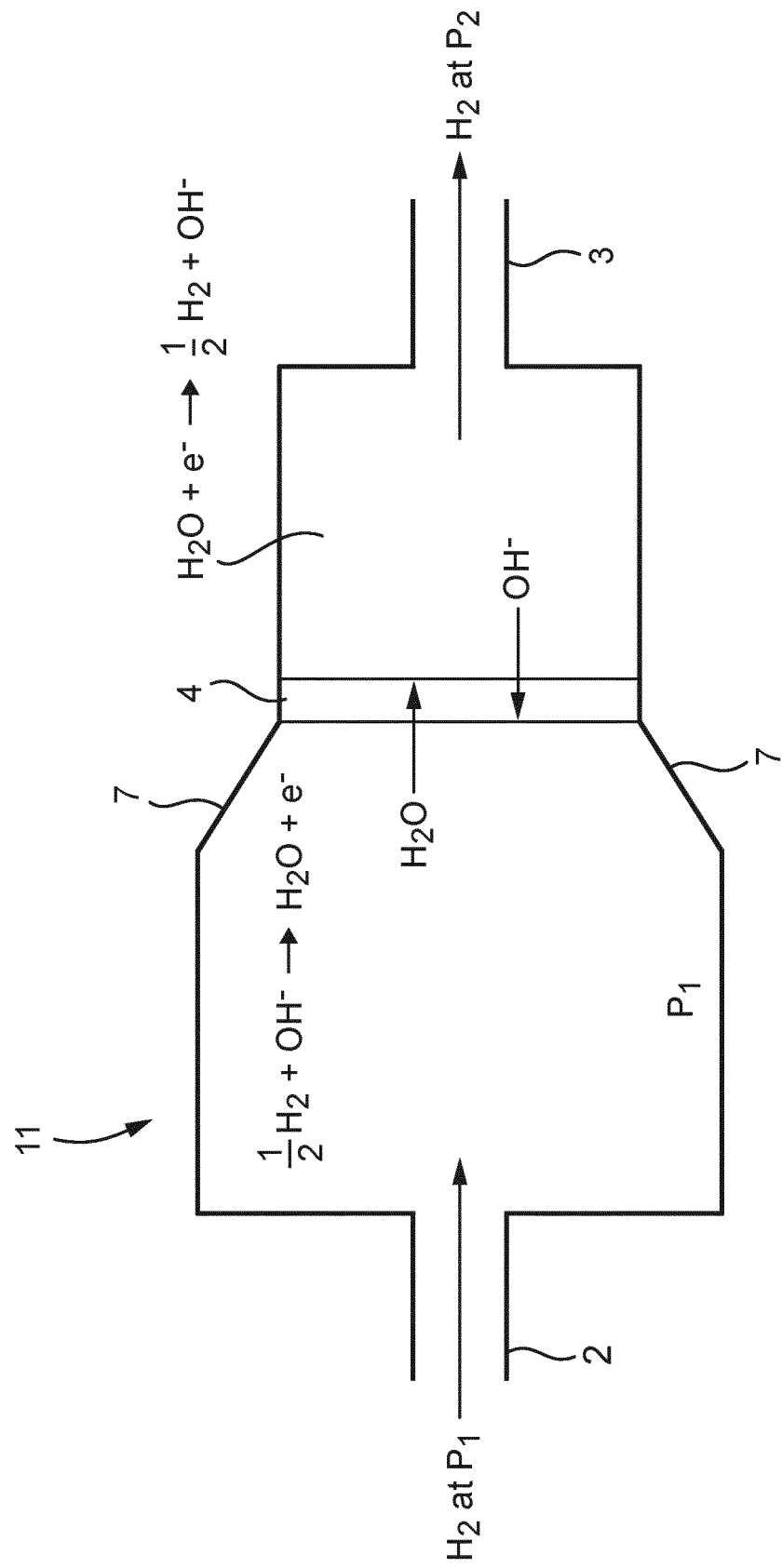

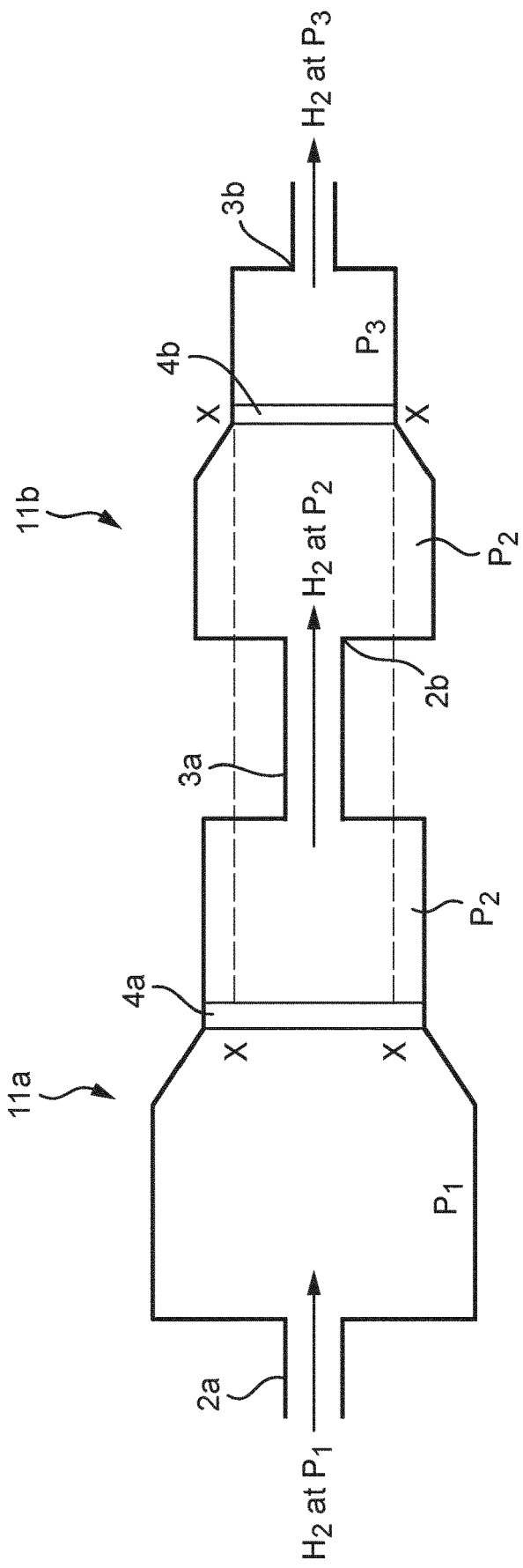

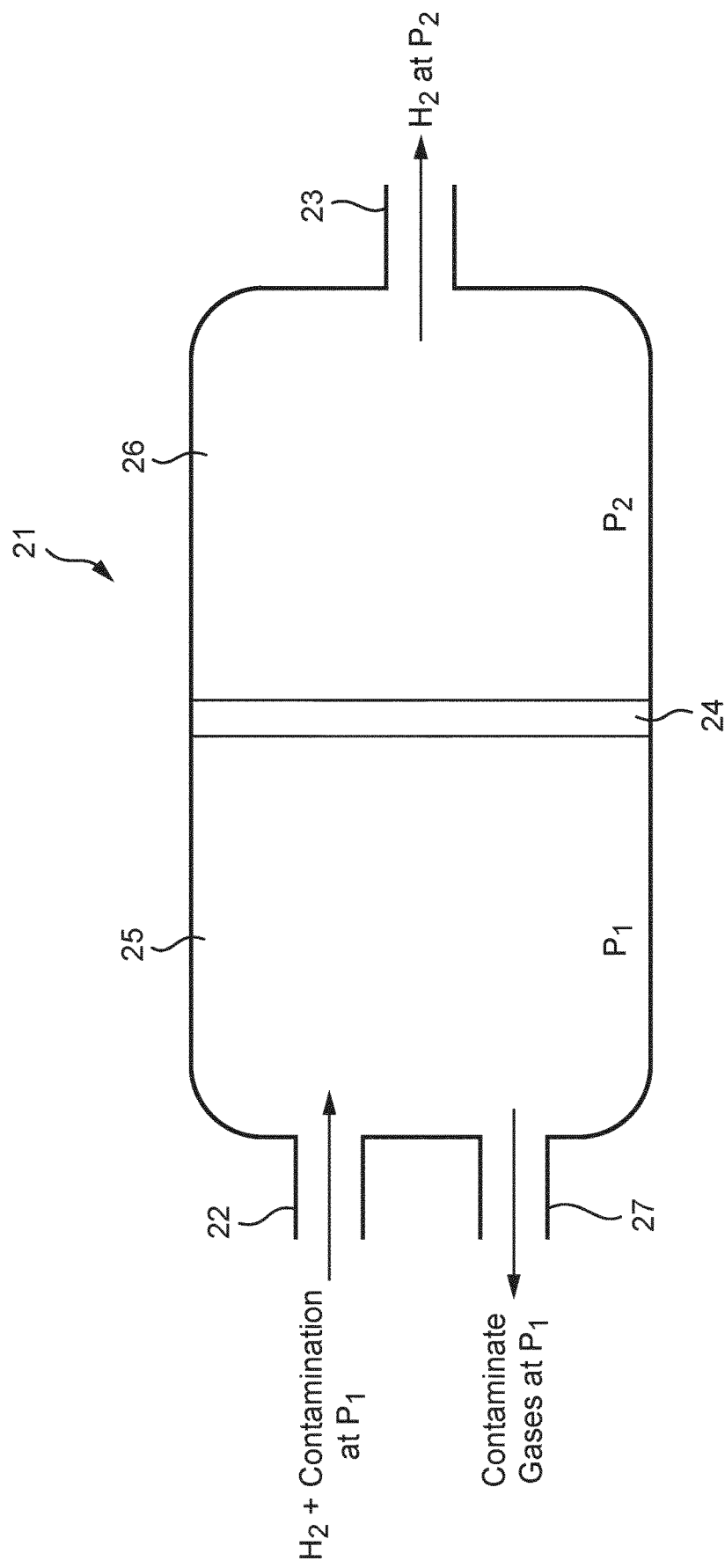

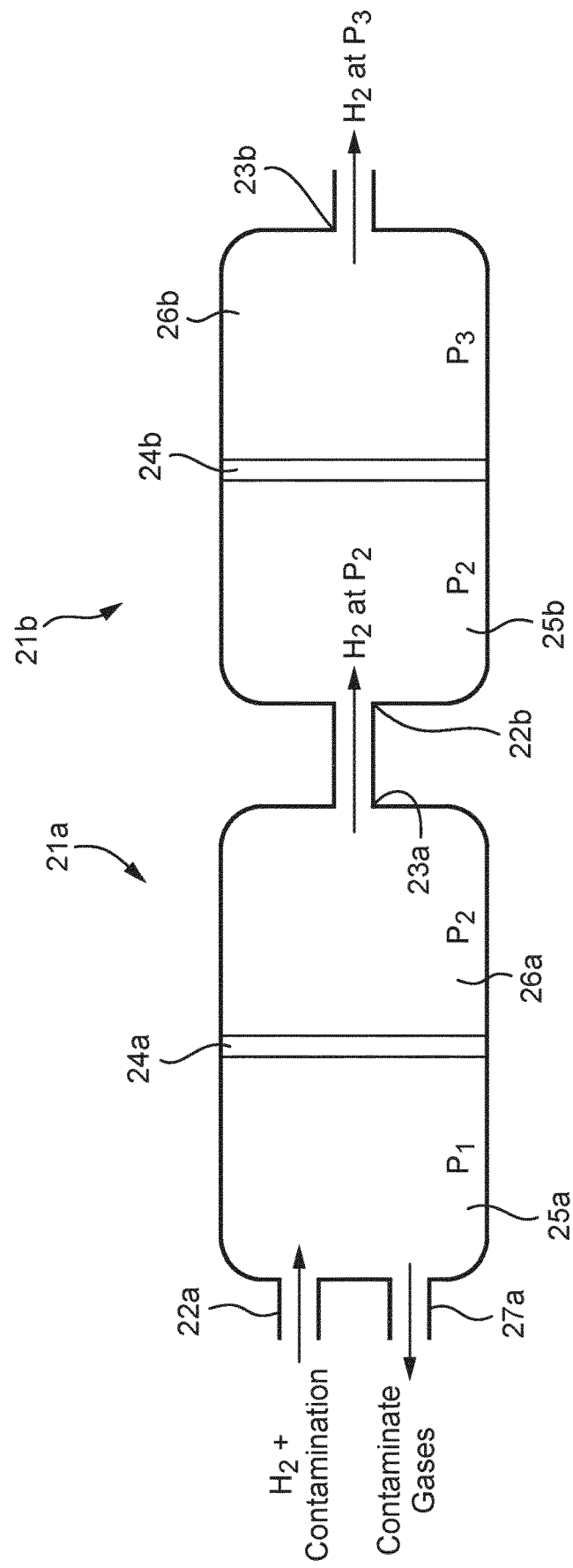

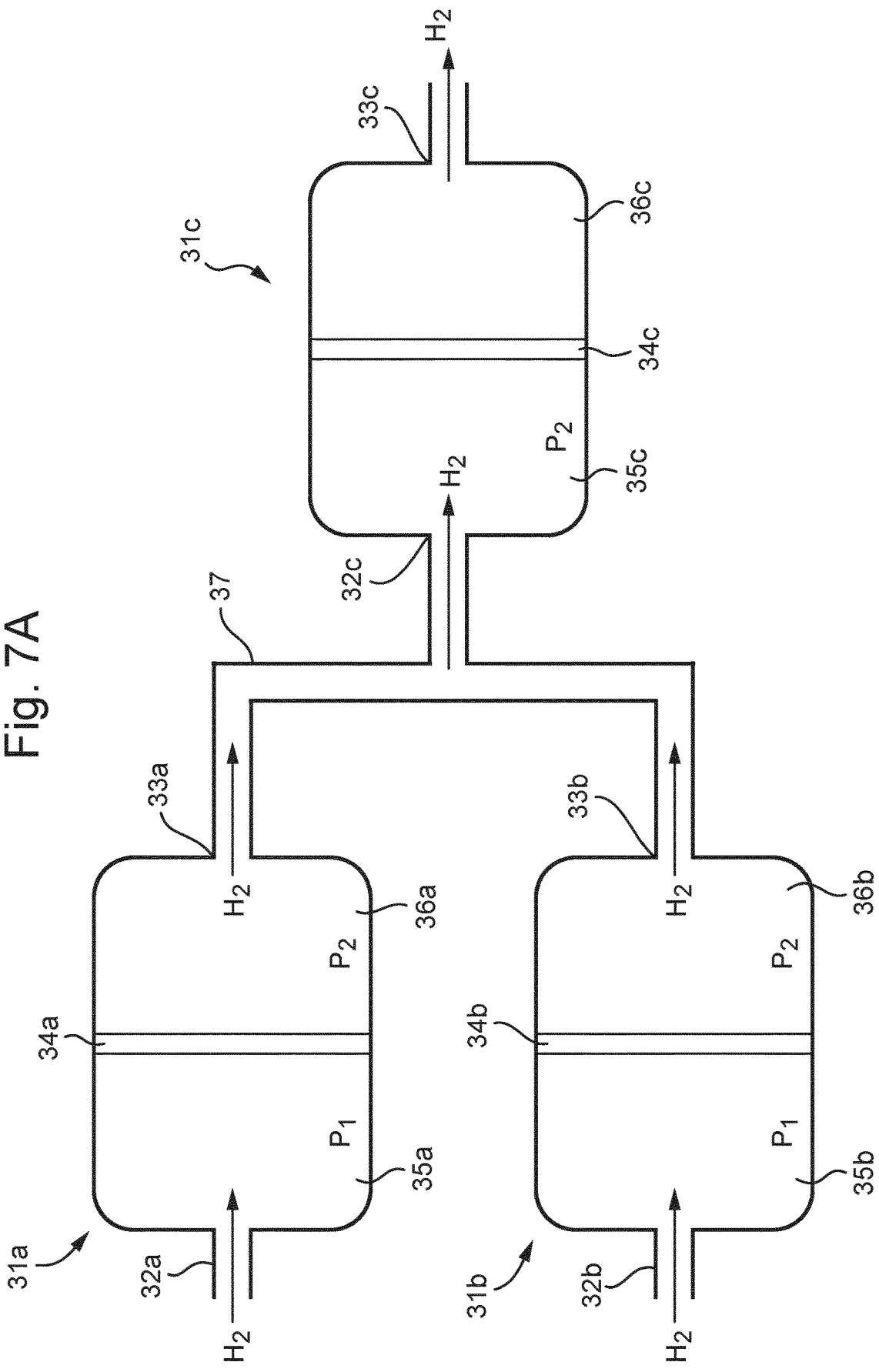

ELECTROCHEMICAL CELL AND METHOD OF PROCESSING A GASEOUS STREAM CONTAINING HYDROGEN

The present invention relates to an electrochemical cell and a method of processing a gaseous stream containing hydrogen, optionally by utilizing one or more electrochemical cells arranged in a stack. The cell or stack may, for example, be used for the purification and compression of hydrogen, for the detection of hydrogen in a stream, and power generation.

Hydrogen can be used in a plurality of ways including as an industrial feedstock, or as a means for long term energy storage. Certain applications, such as fuel cells in vehicles, require elevated pressures such as 350 bar or 700 bar. In some applications, higher pressures still may be desirable. It is imperative that hydrogen stored is dry as residual moisture can damage components, lower efficiency, or have other negative ramifications.

Hydrogen is becoming more widely adopted as a means for energy storage, both long and short term. Hydrogen may be used in existing natural gas pipelines to provide heat, as well as electricity when used in a fuel cell. Hydrogen also has a host of industrial applications.

Electrolysers are devices used for the generation of hydrogen and oxygen by splitting water. Such systems generally fall in one of three main technologies currently available, namely anion exchange membrane (AEM), proton exchange membrane (PEM), and liquid alkaline systems. Other systems, such as solid oxide electrolysis, are available.

Hydrogen can be produced either from hydrocarbons, or electrolytically in an environmentally friendly way, as disclosed in WO 2011/004343. It is preferable to generate "green" hydrogen, removing the reliance upon fossil fuels.

Conventional methods of hydrogen compression include mechanical and non-mechanical means. There are a plurality of issues such as the required energy for mechanical compression, contamination of the hydrogen by oils/lubricants in the compressor, and pre-drying required. Additional considerations include the power supply for such compressors, and their cost.

PEM electrochemical compression sees low pressure hydrogen reacting with water being split into hydronium ions and electrons, the hydronium ions crossing the membrane before recombining to form Hydrogen gas and water. The PEM system sees the following reactions:

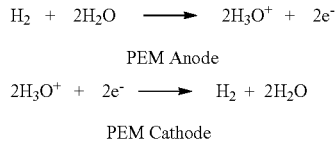

Water is present at the cathode in PEM electrochemical compression systems, a fundamental difference to the reaction pathway observed in the present invention. So, although the hydrogen may be compressed in a PEM electrochemical cell it is inherently moist, and therefore impure, and as such a drier must be employed in PEM electrochemical compression prior to storage.

Furthermore, the acidic environment of PEM means platinum group metal (PGM) catalysts and expensive metals/coatings (e.g. Titanium) must be used. This is a barrier to widespread adoption, for a variety of reasons.

The object of the present invention is to provide means, and a method, for electrochemically compressing, and purifying, hydrogen.

According to the invention there is provided an electrochemical cell comprising:
  an anodic half-cell having an inlet configured to receive hydrogen at a first pressure;
  a cathodic half-cell having an outlet configured to transfer hydrogen at a second pressure;
  a membrane electrode assembly (MEA) separating said anodic half-cell and said cathodic half-cell; and
  a power source;
  wherein said MEA comprises at least:
    an anodic electrode
    a cathodic electrode; and
    an anion exchange membrane (AEM) therebetween.

As used herein, the term "cell" is used to refer to an electrochemical cell. A stack is normally considered a plurality of cells, however, the term may be used to describe a single cell within a stack, or the whole stack.

As used herein, the terms moist, hydrated and humidified, with respect to the anion exchange membrane, are to be used interchangeably.

As used herein, moisture and humidity sensor are used interchangeably, and is intended to cover any and all sensors capable of detecting the presence of water.

As used herein, the term anode and cathode may be used interchangeable with anodic half-cell and cathodic half-cell.

As used herein, the term anion exchange membrane (AEM) may be used for any ion-exchange materials that has anionic exchange properties with or without having also cationic exchange properties (e.g. potassium ions added by KOH doping PBI-based materials or mixed cationic and anionic polymers and/or functionalities). The additional cationic groups may or may not participate in either, or both, half reactions.

As used herein, the term compression generally refers to the increase of pressure, however in some embodiments it is envisaged that a decrease of pressure may be desired, and the term compression may be used synonymously with decompression. The electrochemical cell may be referred to as a compressor, but this does not exclude variants wherein the cell operates as a sensor or means for purification only.

As used herein, the term destination refers to any end use for purified and or compressed hydrogen, such as but not limited to refuelling, or storage.

The balance of plant (BOP) including means for temperature and pressure regulation, valves, wiring etc. are not shown. The connections of the power supply to the electrochemical cell or cells is also not described herein—

As hydrogen is often required at elevated pressures, higher than those achievable by a single cell compressor, it is envisaged that one or more cells may be used in series, the plurality of cells constituting a stack. It is noted that one or more stacks may be used in a compressor. Additionally, if the concentration of impurities is above a certain level, more than one cell may be desired.

According to the invention there is provided a second embodiment of An electrochemical cell assembly comprising at least first and second electrochemical cells substantially as described above, configured in a stack, wherein the outlet of the cathodic half-cell of said first electrochemical cell is in fluid communication with the inlet of the anodic half-cell of the second electrochemical cell.

As used herein, the term stage of cells refers to one or more cells wherein the hydrogen entering the anode is substantially similar in pressure to each other, and the cathodic outlet of each cell or cells in a stage are combined to become the feed to the anode of the cell or cells in the next stage. Each stage may have connection in parallel, series, or a combination thereof.

It is common practice to have multiple stages of compression when compressing a fluid. The same can be applied to electrochemical compression. In one embodiment of the present invention, it is envisaged that there are multiple stages of compression achieved by having one or more cells at each stage, as discussed above. Hydrogen enters the anodes of the cell or cells in the first stage at a first pressure, with the cathodic outlet or outlets from the cells in the first stage being at a second pressure, said outlets being combined. The cathodic outlet from the first stage at the second pressure is normally the input of one or more anodic half-cells at the second stage, or if there is only one stage of compression/purification the outlet goes to storage.

It is envisaged the cells or stacks of each stage can be arranged in parallel, or as a means to save space, in series with the pipework and BOP allowing for the multiple stages. The various arrangements are depicted in the figures. Means for separating and or insulating each cell may be provided.

The sum of current applied to the cell, or stack thereof, for each group of cells, or stage of compression, is generally substantially the same as the next group or stage of compression. Variances in the required current across the membranes at each stage occur if the pressure differential in each cell at one stage differs to the other. A higher-pressure differential requires a higher current density in order overcome hydrogen back-diffusion (cross-over). This may, however, result in lower faradic efficiency. This embodiment is depicted in the figures.

Normally, the purification occurs with simultaneous compression. In such an embodiment the second pressure is higher than the first pressure. Any known means for regulating pressure may be used on the or each cathodic outlet such that the hydrogen leaves the cathodic outlet at an elevated pressure. In alternative embodiments, there may be a requirement to decompress hydrogen, and the means for regulating pressure may be made accordingly.

In an AEM compressor with a single cell, or stack thereof, the hydrogen enters the anodic half-cell of the first cell at a first pressure, and hydrogen is pressurised to a second pressure in the first cathodic half-cell. The hydrogen stream at the second pressure is communicated from the first cathodic half-cell to the anodic half-cell of the second cell. The hydrogen is pressurised to a third pressure in the second cathodic half-cell, and so on. In a series of cells, the pressure gets progressively higher, for example, P1<P2<P3<P4 etc. It is envisaged that the cathodic half-cell has a higher pressure than the anode, and the hydrogen contained therein is purer than the hydrogen in the corresponding anode, and of previous cells.

AEM systems are inherently different to PEM as it is hydroxyl anions, OH⁻, which cross the membrane and not hydronium (solvated proton). As such, the mechanism of operation is different, and novel issues must be overcome. The reactions are as follows:

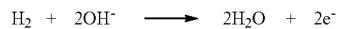

AEM Anode

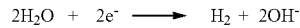

AEM Cathode

Electrochemical compression in an AEM based system should not require further drying as water is consumed at the cathode in parallel with hydrogen compression. A distinct benefit over alternatives seen in current practice.

This reaction pathway is fundamentally different to PEM, and contrary to the commonly held belief in the field of electrochemistry that hydrogen must split into two hydrogen ions.

It can be seen that the hydrogen electrochemically compressed in an AEM system is dry. The substantially dry hydrogen may go from a first to second cell, and so on, as water is generated in the anodic reaction, and consumed in the cathodic reaction. The MEA is preferably adapted to retain water, with means for water management described herein.

In PEM systems platinum or platinum group metals (PGM) are required as a catalyst at both the anode and the cathode. In the present invention of AEM electrochemical compression, PGM catalysts may be used, but are not required rendering the system inherently more sustainable. Any known catalyst for the Hydrogen Evolution Reaction (HER) and/or Hydrogen Oxidation reaction (HOR) may be used, the present invention is not intended to be limited by the catalyst. The anodic catalyst and cathodic catalyst may be the same, or different.

The MEA may be ionomer-free, and/or binder-free. Alternatively, it may have both, or either of, ionomer and binder. It is envisaged, in one embodiment, that the MEA comprises a substrate with electrically conductive whiskers and a thin catalyst layer is sputtered thereupon to maximise surface area and minimise catalyst requirement. The intimate contact with a high surface area mitigates the requirement for ionomer.

The anion exchange membrane may be any membrane with the desired properties. The properties required are mainly high ionic conductivity, low gas permeability, high mechanical strength and hydrophilicity. However, it is envisaged that the membrane may be a composite membrane. The composite membrane comprising an inorganic filler of hygroscopic particles, such as nano-particles of clay such as, but not limited to, montmorillonite, or an organic filler such as any ionomer nanoparticles or fibres produced, but not limited to, by electrospinning or a combination of thereof. The ionomer may be anionic ionomer.

It is envisaged that the membrane will have a polymeric backbone with an inorganic and/or organic filler, that filler being hydrophilic. The hydrophilic properties retain the water and help ensure the hydrogen at the raised pressure remains dry. It is envisaged that the polymer may be polybenzimidazole (PBI), preferably modified to increase its alkaline resistance and/or covalently binding a positive charge, but this is not intended to be a limiting feature. Additionally, it is envisaged that the membrane may be doped with excess OH⁻, compared to the ion-exchange capacity derived by either covalently bound positive charge (e.g. quaternary ammonium salt) and/or by neutralizing acidic hydrogen (e.g. pyrrolic hydrogen in PBI), using, but not limited to, highly concentrated alkaline solution (e.g. KOH). The source of OH⁻ may be in any form but is preferably aqueous.

When electrochemically compressing hydrogen, the pressure differential across the membrane must be considered. If too high, the membrane or other components may be damaged. Increasing the mechanical strength of the membrane may reduce its performance in other areas such as ionic conductivity. There is no theoretical limit to the pressure differential in a single cell, however practically there are limitations due to the integrity of the components, and crossover. It is envisaged that each cell will be able to see a pressure increase between 1 bar and 2000 bar, more preferably between 1 bar and 1000 bar. The pressure differential may be in the range of 10 bar to 500 bar, 10 bar to 100 bar, 10 bar to 80 bar, 20 bar to 50 bar, 30 bar to 40 bar. It is envisaged the AEM electrochemical compressor will see approximately 35 bar increase per cell in a stack.

Whilst it is envisaged that the electrochemical compressor would work with hydrogen generated by any known means, such as steam reformation, it is preferred to utilise a green hydrogen source. To achieve this, it is preferred that the inlet stream is an outlet stream from an electrolyser, more preferably still, an AEM electrolyser. Contaminants may be present, but should be limited to water and oxygen. Other contaminants, if present, should not run the risk of poisoning the catalyst, this excludes species such as carbon monoxide. Other contaminants may react with the $OH^-$ e.g. acids or salts containing anions different to $OH^-$. Certain circumstances may arise where gaseous acids are permissible, such as $CO_2$, $SO_3$, $NO_3$ etc. these are permissible as the poisoning of the catalyst is temporary as they can be converted to their acidic form on the anode side of the reaction, where hydroxyl ions are consumed, thereby purging the acid. In embodiments compressing hydrogen from steam reformation, the contaminants therein shall be removed.

The present invention both pressurises and purifies the hydrogen; any allowed contaminants do not pass beyond the first half-cell. The water should remain membrane bound, and the $OH^-$ generated at the cathode migrates to the anode whereupon it is consumed by the anodic reaction. Some water may be transported from the cathode to the anode with the $OH^-$ via electro-osmotic drag. The water flux across the membrane, in both magnitude and direction, is dependent upon the current supplied.

It is envisaged that the power may be supplied as DC, AC, pulsed current or reverse pulse current. However, in the preferred embodiment the power supply is any one of DC, pulse current, or reverse pulse. The benefit of reverse pulse being that the electrodes will be purged of poisons when current is reversed temporarily.

The membrane in each and every cell must remain sufficiently moist. The water generated in the anodic reaction serves this purpose, along with the membrane being selected for its properties. The water produced should be sufficient to maintain the moisture of the membrane, without flooding the cathode or being stripped in the hydrogen cathodic flow. In order to inhibit/prevent undesired movement of water, means for water management are used and disclosed herein.

For example, a microporous layer (MPL) may be employed which is porous enough to permit the movement of hydrogen, but prevents the flux of water across the MPL in either direction. Furthermore, the membrane may have a hydrophilic component, keeping the water membrane bound, but available for the cathodic reaction.

Whilst the MEA may consist of an anode, anion exchange membrane and a cathode, normally there will be more layers. Any one or more of the following can be included, on one side or both, alone or in combination. A gas diffusion layer (GDL) may be present on one of, or both of the cathode and anode. If present the MEA is structured: anode GDL, anode catalyst layer, membrane, cathode catalyst layer, cathode GDL. In another embodiment, an MPL may be used. The MPL generally would be on the cathode side only but may also be on the anodic side only, or both if more than one is used, the MPLs may be the same or different, the MPL being selected for its porosity and hydrophobic properties. A water management membrane may also be used on the anodic or cathodic side, or both, discussed further below.

It is envisaged that the MPL may be on the membrane of each cell on the cathode side or only one or some of the membranes. Alternatively, the MPL may also be on the anode side, or both the anode and cathode sides. It is further envisaged that the MPL, if used, may have different properties at various locations in the stack, such as being more hydrophobic in the latter cells. An MPL which is more hydrophobic in the final cell, or cells, would prevent (excess) water from being present in the final outlet, which may be less desirable in the first cells should other properties of the membrane be impacted by the varied MPL properties. MPLs are generally produced by casting a slurry containing an electronically conductive material and a binding agent upon a substrate. The electronically conductive material being something, such as but not limited to carbon black, nickel nano particles etc. The binding agent being a hydrophobic polymer, such as but not limited to PTFE, FEP etc. The pore size, distribution, distribution of pores of various sizes, hydrophobicity and other physio-chemical properties can be adjusted by varying each constituent component, their ratios and or the manufacturing procedure.

Another means for water management is the inclusion of an ionomer to the MEA on one or both sides of the AEM ie. the anodic and cathodic sides. It is preferred that there will be ionomer on both the cathodic and anodic sides of the membrane. Normally, for the purpose of water management, there will be relatively more ionomer on the cathodic side than the anodic side. Alternatively, it is envisaged that there may be no ionomer on the anodic side of the AEM, whilst there is ionomer on the other side of the membrane.

Yet another means for water management in the membrane is the inclusion of a water management membrane in the MEA. Such a membrane will preferably be hygroscopic, and on the cathodic side of the MEA. The water management membrane will also preferably be highly ionically and/or electronically conductive. The water management membrane may be on the anodic side, cathodic side or both. In yet another embodiment, a water management membrane may be sandwiched between two AEMs, the water management membrane in any of the embodiments being part of the MEA. An example water management membrane would be an ionomer mixed with carbon black.

Still yet another means for water management is the utilisation of a composite anion exchange membrane, wherein the filler/nano/micro particles have hygroscopic properties. It is envisaged that such particles may have a concentration gradient within the membrane, or be a distinct layer on one or both sides of the AEM, not necessarily abutting said AEM. The cathodic side of the membrane having a relatively higher concentration of said particles compared to the anodic side.

It is envisaged that any one of the water management mechanisms mentioned in this document can be used alone, and or in combination with each other.

According to the invention there is provided a method of processing a gaseous stream containing hydrogen, comprising providing an electrochemical cell substantially as described above, feeding a hydrogen-containing gaseous stream to the inlet of the anodic half-cell, and transmitting hydrogen from the outlet of the cathodic half-cell.

All structural limitations discussed pertaining to the apparatus apply to the method of operating the cell, accordingly the same is said for the method of using the compressor with a stack of cells.

The method of operating a single cell compressor can largely be applied to operating a compressor comprising a stack of cells.

According to the present invention there is provided a method of processing a gaseous stream containing hydrogen, comprising providing an electrochemical cell assembly substantially as described above, feeding a hydrogen-containing gaseous stream to the inlet of the anodic half-cell of the first electrochemical cell in the stack, transferring hydrogen from the outlet of the cathodic half-cell of each electrochemical cell in the stack to the inlet of the anodic half-cell of another electrochemical cell, and delivering hydrogen from the output of the cathodic half-cell of a last electrochemical cell in the stack to an external destination.

For the electrochemical cell, the electrochemical cell assembly and the methods described above, the inlet stream may be directly from an electrolyser, hydrogen storage tank or any other conceivable source of hydrogen at reasonable levels of purity.

The only contaminants considered likely, especially from the electrolytic production of hydrogen, are water and oxygen. The water should become membrane bound, and oxygen will react in the first anodic half-cell with hydrogen to produce water. Preferably, the catalyst is not active towards ORR, and the oxygen present is vented from the anodic half-cell. These contaminants are therefore not considered an issue. However, it is possible that other contaminants may be present, such as $CO_2$, $NO_2$, $SO_3$ etc. these may reduce the efficiency of the first few cells, as such means for purging the anodic half-cells may be provided.

All structural limitations discussed pertaining to the apparatus apply to the method of operating the cell or stacks and shall be handled accordingly.

It is envisaged that the final outlet of the stack is connected to a storage tank, or tanks, adapted to house hydrogen at the desired pressure, this can be anywhere from 30 bar to 1000 bar. The pressure can be raised to any required level, including industry standards of 300 bar, 700 bar and 1000 bar. It is envisaged that the pressurised hydrogen from the outlet could be directed to any system or means which uses pressurised hydrogen, transport, or for storage.

As water is consumed in the or each cathodic compartment, the hydrogen is effectively dried whilst compressed. This fundamentally differs to PEM electrochemical compression wherein water is involved in the form of hydronium (solvated proton). In PEM systems, water is transported to the cathode, along with hydrogen ions in the form of hydronium. The hydrogen produced is therefore inherently moist. In order to maintain the required conductive properties of the membrane, it is important to ensure the, or each, membrane within the stack is adequately hydrated. If the water generated in anodic half-cell is insufficient, it is envisaged that stable water content of the membrane can be achieved by adding water to the hydrogen inlet to ensure the feed is moist. However, it is possible too much water may be added to the stream, causing the outlet stream to be moist, or the anodic half cell to be flooded, preventing hydrogen to come in contact with the anodic catalyst. This would achieve the goal of pressurizing but not drying the hydrogen, or can decrease the cell efficiency due to mass transport overvoltages. To achieve both pressurized and dry hydrogen, a control system may be used, described below.

In order to control the moisture in the system, it is envisaged at least two moisture sensors will be employed. A first moisture sensor being on the feed stream, and a second moisture sensor being on the, or each, outlet stream but most importantly the outlet of the hydrogen at the final cell. It is also possible to include a moisture sensor on one or all of the cells in the stack to determine the saturation of a membrane at a given point in the stack, thereby enabling the operator to determine if a membrane is inoperably dry within the stack, moist hydrogen from the outlet may either be vented, or preferably decompressed and recirculated to the inlet, as discussed below. Alternatively, a thermal conductivity sensor may be used instead of a moisture sensor. Any suitable alternative form of sensor may be used.

The two or more sensors are operably connected to a control module, such as but not limited to a PID controller. If moisture levels fall below a pre-determined threshold, water will be introduced to one or more water inlets. It is envisaged that a plurality of inlets for the introduction of water could be on the stack, normally into either a cathodic compartment, anodic compartment or between cells. However, due to the increasing pressure along the stack it is preferred that a single inlet for additional water is provided on the feed stream, at a first pressure, said inlet being after the first sensor, and said water inlet being before the stack, or into the first anodic compartment.

If moist hydrogen leaves the final cell of the compressor it may be an issue. Moist hydrogen may not be fit for purpose and therefore should not be stored. Accordingly, in the event of moist hydrogen leaving the stack, it is envisaged that the hydrogen can be vented. In a preferred embodiment, the damp hydrogen can be recirculated from the outlet prior to the destination of the hydrogen. It is envisaged that the recycle would be from the outlet to the inlet via means for decompressing the pressurised hydrogen to a level suitable for reintroduction at an earlier stage of the compressor stack.

It is envisaged that an interim storage tank may be provided on the recycle stream to minimise the need for venting, should there have been an excess of moisture. It is envisaged that the interim storage tank could have means for draining condensed moisture to remove it from the tank. Ideally, means are provided to direct the water for reuse in this or another system.

Green hydrogen produced via electrolysis normally happens by utilising excess energy from renewable source. This inevitably results in discontinuous generation of hydrogen. Therefore, the feed stream for the electrochemical compression stack may also be discontinuous. The electrochemical purifier and compressor is adapted for intermittent operation. A buffer tank may be employed between the electrolyser and compressor for storage of hydrogen at an intermediate pressure, e.g. 35 bar, to allow for a more consistent supply of hydrogen to the AEM compressor.

Whilst the membranes may all have the same thickness, it is envisaged that the membrane thickness may vary between the cells of a stack. In one embodiment, the thickest membrane may be in the first cell, with subsequent cells having thinner membranes. Alternatively, the first cell may have a thinner membrane with the membranes becoming progressively thicker. In yet another embodiment the thickness can vary non-linearly, going from relatively thin to thick and thin again, or thick to thin to thick again, or any variant thereof. Thicker membranes will retain more water, and so could ensure the membranes are more resilient to moisture level variations ensuring that conductive properties are maintained, and that reducing the likelihood of the hydrogen outlet being moist. Thicker membranes may also be more resilient to larger pressure differentials, allowing for fewer cells to be required to enact the same step change in pressure difference.

Thicker membranes are relatively resilient to greater pressure differentials, and higher pressures generally. That said, it is envisaged that supports for the or each side of the membrane may be provided. The supports may be any suitable material, namely one which will not react in a detrimental manner to the system. Any suitable membrane support may be used, such as but not limited to nickel foam. The support may be a mesh or any other suitable structure to aid the membranes resilience to pressure. Additionally, the membrane support helps prevent creep of the membrane at elevated pressure differentials.

In the preferred embodiment, the cell, or stack thereof, are provided with means for thermal management. The heating and/or cooling can ensure the optimum temperature is reached. It is envisaged that this is above room temperatures, but below 100° C., more preferably between 40° C. and 80° C., and substantially 60° C.

It is envisaged that means for thermal management for the cell or stack may be provided. Heating and or cooling may be provided by usage of a heating cartridge or a radiator installed on a or each endplate of the stack, or cell, and/or intermediate frames for example. Another alternative is liquid to be circulated inside or in contact with any of the above cited components, but preferably not in contact with any component which may impact the reaction or stack efficiency.

Whilst it is envisaged that the stacks are constructed with each cell having a substantially identical cross-sectional area, the stack may comprise cells of varying cross-sectional areas. In such an embodiment, the cross-sectional area would become progressively smaller from the first to last cell, accordingly increasing the current density to maintain the same hydrogen flow, proportional to the total current, aiding the pressure increase passively due to the reduced volume and improve water management by increasing electroosmotic drag in case of excess water is transported by one cell to the next by the cathodic hydrogen stream. The opposite, i.e. the cross-sectional area would become progressively larger from the first to last cell, accordingly decreasing the current density, aiding water management in case of progressive dehydration from one cell to the next. Each cell cross section may vary, or multiple cells in the stack may have the same cross-sectional area prior to area reduction. In yet another embodiment the cross section may vary non-linearly from relatively large to small and large again, or small to large to small.

The cross section of the cell or stack thereof may be any shape. It is envisaged that the shape will be either circular, square or rectangular. Alternatively any other shape may be used, such as, but not limited to a: pentagon, hexagon, heptagon, octagon and so on. Alternatively, any other regular, or irregular shape may be used for the cross-sectional area.

It is envisaged that a combination of varying cross-sectional area and thickness of the membrane could be employed, as well as other described variants, such as the MPL, or GDL. In an embodiment wherein the cross-sectional area decreases along the stack, the membrane thickness could increase along the stack. Such a configuration would aid in increasing the pressure due to the reduced volume and would help reduce water content in the cathodic hydrogen stream by increasing the electroosmotic drag with the higher current density and reducing water transport due to the thicker membrane. Other embodiments may use any combination of the afore mentioned variants.

It is important to ensure there is enough water on the or each membrane at start up, assembly of the compressor, and standby conditions should take this into account, by ensuring the membranes, and MEA generally, are substantially saturated when assembled. Means for dosing with water may also be provided to the or each anodic cell.

Whilst the present invention is not intended to be limited by the catalyst or the method of depositing said catalyse, it is envisaged that the catalyst may be deployed by using a catalyst slurry or spray upon an electrically conductive substrate. The catalyst will normally comprise nanoparticles, and the electrically conductive catalyst layer substrate may be something such as carbon cloth, or Ni foam. Another catalyst substrate may be Ce, or nano/microparticles thereof.

It should be noted that the electrochemical compression requires no moving parts, with all the associated benefits. Furthermore, the electrochemical compression has far lower energy requirements than alternative forms of compression, and is therefore inherently more environmentally sound, and improves the overall efficiency when considering the production and management of hydrogen. The compression may be achieved in a single stage, dependent upon the resilience of the membrane used. Additionally, the process can be isothermal as opposed to adiabatic.

The electrochemical compressor, as described herein, may be used in other applications with a substantially similar configuration.

It is preferred that the hydrogen to be compressed is obtained via electrolysis, or another green source of hydrogen. In such instances, although applicable to all scenarios, the electrochemical cell or cells are likely to be operated intermittently. During ramp down/transition to standby procedures, the pressure gradient within the stack will equalise, as opposed to maintaining a pressure gradient. It is possible to obtain energy from the cell or cells by reversing the current flow to the stack during the transition to standby. The power generated may be stored by any known means for later use. Such operation minimises energy wastage. The energy coming from decompression of the pressurised hydrogen, by exploiting the pressure differential which creates an electromotive force.

Whilst it is envisaged that the pressurised hydrogen is leaving the cell or stack will be stored, an alternative embodiment allows for direct refuelling of a hydrogen requiring device, such as but not limited to a car, forklift, boat, bus or any other hydrogen powered device. In such an embodiment, a suitably rated pipeline and nozzle should be employed.

Another alternative application for the electrochemical cell, or stack, as disclosed is as a hydrogen sensor. The presence of hydrogen gas within a stream may be detected by feeding the potentially hydrogen comprising gas to the anode of a cell and applying a voltage to the cell or stack. If hydrogen is present, a current will be measured, the current being proportional to its partial pressure. Conversely a current may be applied and the measured voltage being indicative of the presence of hydrogen in the gaseous stream. In order to prevent a build-up of pressure in the anode of a cell being used as a hydrogen sensor, an outlet from the anode to prevent undesirable pressure build up is required. Without said anode outlet, the stream being tested for hydrogen would not have a route out of the cell. This is discussed further in another application below. If the anodic flow rate is high, with a high % of hydrogen in said stream, the electrochemical cell may be configured to act as a sensor only, or a simultaneous sensor and compressor. Pressure regulation means and a control system, as in other embodiments, would be required for either configuration.

Another means for detecting hydrogen passively is to measure the cells open circuit voltage. The catalyst may be the same, or different on either side. The open circuit potential is directly proportional to the partial pressure of the contaminant gas present and may be measured passively. Calibration for such an embodiment of the sensor would be needed by introducing gaseous streams of known composition to the electrochemical cell.

Still yet another application for a single cell, or stack thereof, in accordance with the present invention is the separation, and compression, of hydrogen from a stream containing hydrogen gas. It is envisaged this will be applied to streams of natural gas containing hydrogen, but any gas comprising hydrogen may be used. That said some gases may negatively impact the longevity of the cell, or stack, such as but not limited to carbon monoxide, carbon dioxide, or ammonia. The contaminants will not cross the membrane, electrochemically or otherwise, and as such will remain in the anodic half-cell. In order to prevent a pressure build-up in the anode of the first cell, an outlet is provided for the removal of the gas contaminants. It is possible some hydrogen would remain in the anodic outlet stream, and so it is envisaged that the gas may be recycled to the anode for further purification. A hydrogen sensor as described above may be used to detect the presence of hydrogen, and determine the need to recycle.

An anodic outlet may be used on any cell in a stack for any embodiment but is most preferably implemented for use on the first cell, or stage of cells to allow for the purging of contaminants from the anodic half-cell or cells. This does not preclude the inclusion of anodic outlets on subsequent cells.

Means for regulating pressure may be provided on any one or more of the inlet to the anodic cell, the outlet of the anodic cell, if present, or the outlet of the cathodic cell. Such means includes but is not limited to a valve.

To help understanding of the invention, a specific embodiment thereof will now be described by way of example and with reference to the accompanying drawings, in which:

FIG. 2 depicts a plurality of cells forming an AEM electrochemical stack,

FIG. 3a depicts a single cell AEM electrochemical cell,

FIG. 3b depicts a plurality of cells forming an AEM electrochemical stack,

Figure 7B:
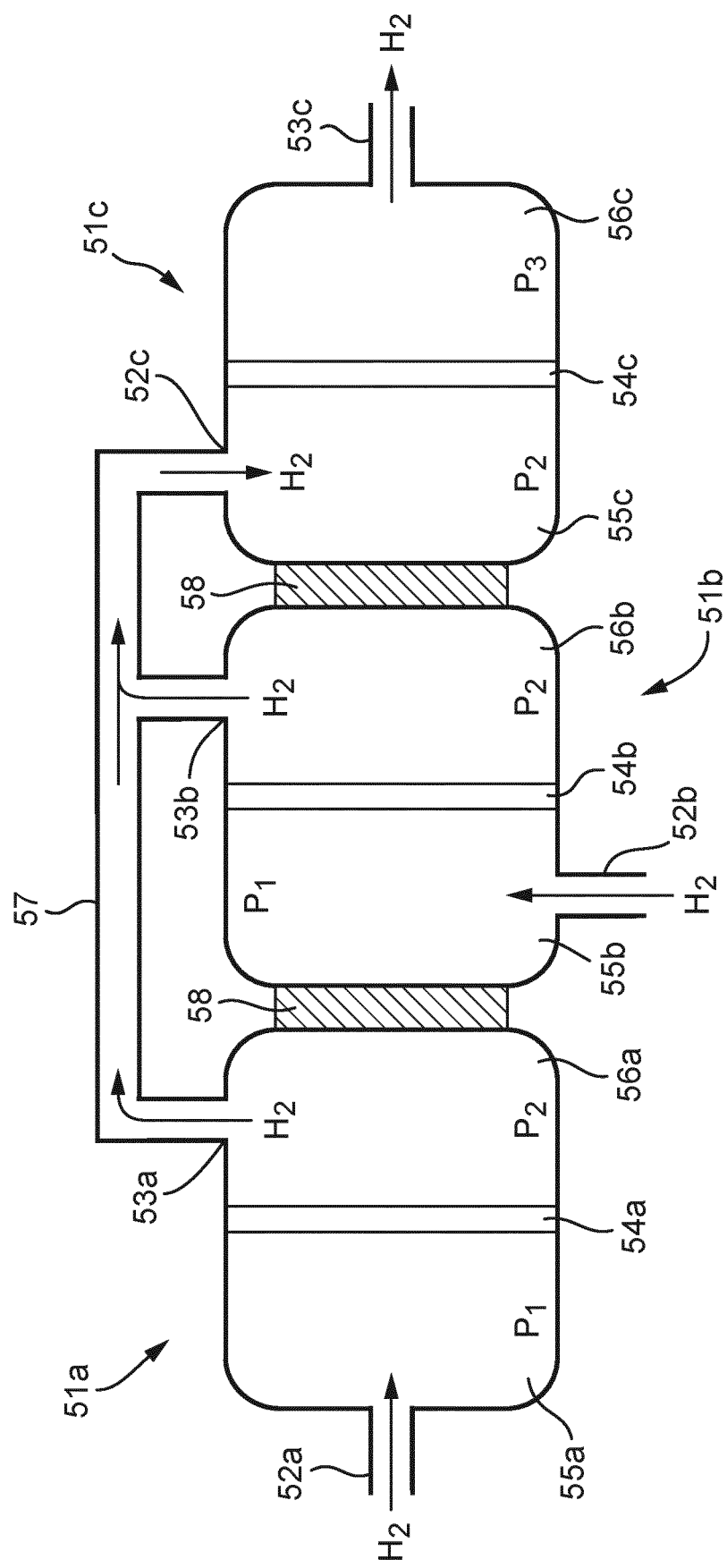

FIG. 5 depicts an electrochemical cell in accordance with the present invention suitable for use as either a hydrogen sensor, or to strip hydrogen from a stream of gas containing hydrogen, FIG. 6 shows the electrochemical cell of FIG. 5 with an additional cell for the further compression of hydrogen, FIG. 7a depicts an electrochemical compressor comprising multiple cells as a first stage of compression, and FIG. 7b depicts an electrochemical compressor comprising multiple cells as a first stage of compression in an alternative arrangement.

Figure 1:
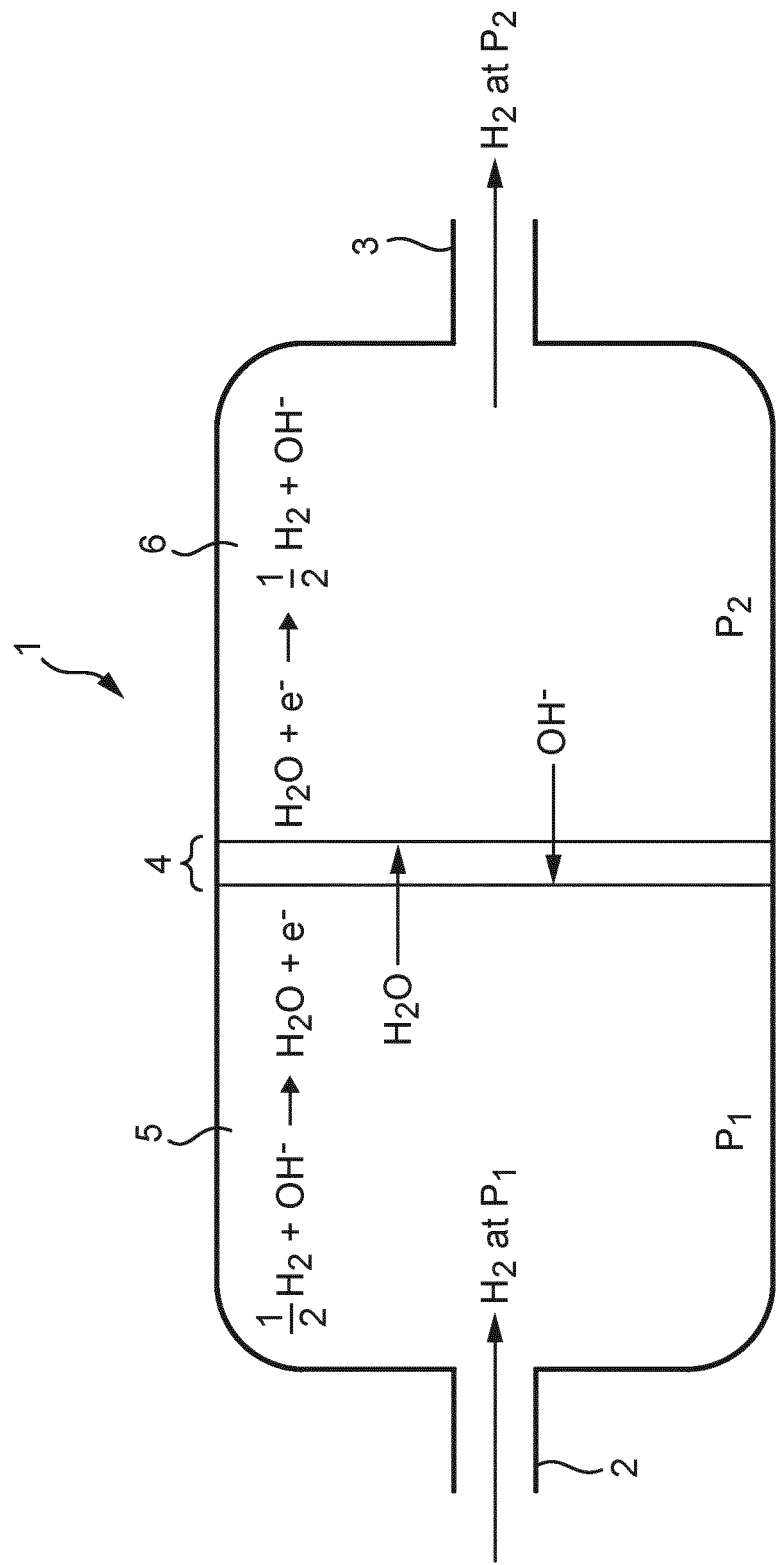
FIG. 1 depicts a single cell AEM electrochemical compressor.

Referring to FIG. 1, there can be seen a single cell AEM electrochemical compressor 1. There is an inlet 2 and an outlet 3. Through the inlet 2 a stream of predominantly hydrogen from either an electrolyser or other hydrogen source is fed to an anodic half-cell 5 the MEA 4 separates the anodic half-cell 5 from the cathodic half-cell 6. The hydrogen enters the anodic half-cell 5 at a first pressure, $P_1$, and is increased to a second higher pressure, $P_2$, in the cathodic half-cell 6. The reactions in both the anode and cathode half-cells follow:

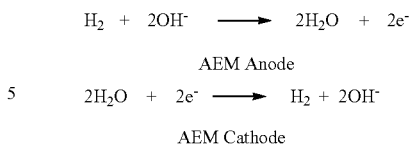

AEM Anode

AEM Cathode

Figure 4:
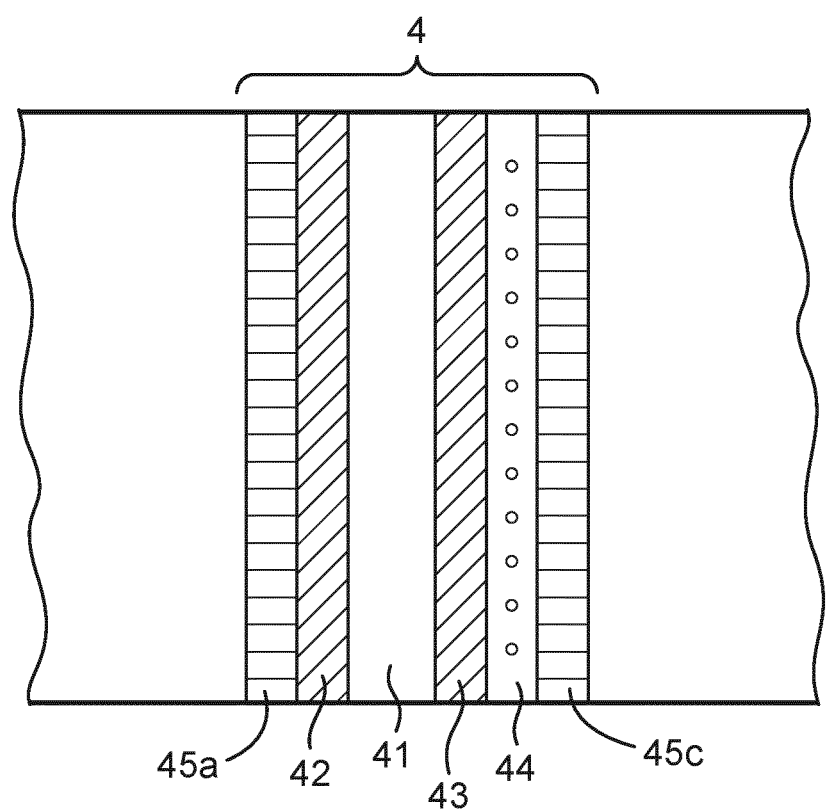
FIG. 4 depicts an MEA suitable for use in the present invention.

The MEA 4 separates the two half-cells, and will comprise of at least anode, cathode and AEM therebetween. Additional layers such as a GDL or MPL may be used, with their properties varying as required, as described above. FIG. 4 is an enlarged diagram of the MEA 4.

The water generated at the anode becomes bound to the membrane whereupon it is consumed in the cathodic reaction. The $OH^-$ generated in the cathode migrates back to the anode whereupon it is consumed in the anodic reaction. The electrons from the anode are consumed at the cathode.

It is noted that contaminants such as water or oxygen may be present in the hydrogen inlet. Neither is problematic as the water will behave as discussed above, and the oxygen may react with the hydrogen in the first anodic half-cell to generate water, depending upon the catalyst.

It is most probable that a single cell AEM electrochemical compressor will be insufficient to reach the required pressure, as such a plurality of cells may be used in series forming a stack, as can be seen in FIG. 2.

FIG. 2 (BOP not shown) depicts a plurality of cells, 1a 1b and 1c, forming a stack 10. the square brackets around 1b demonstrate that there may be more than three cells in a stack. The number of cells in a stack is not intended to be a limiting feature of the present invention. Hydrogen from an electrolyser, or interim storage, or other source, enters the first anodic compartment at $P_1$ through the inlet 2a. The anodic reaction occurs, with hydrogen being generated at the cathode in the cathodic reaction until $P_2$ is reached in 3a. The hydrogen at $P_2$ from the first cathode 6a is communicated to the anode of a second cell 5b, still at $P_2$ through the outlet 3a which is connected to the inlet 2b. The second anodic and cathodic reactions occur in half-cells 5b and 6b, with hydrogen being produced in the second cathodic 6b compartment until $P_3$ is reached. This continues in series until the final cell of the stack, in this FIG. 1c, wherein the hydrogen is fed to a storage tank, or other destination requiring pressurised hydrogen from the final outlet, 3c at the final pressure $P_4$. The control system and BOP are not shown.

Referring to FIGS. 3a and 3b, shown are cells with a varied MEA cross-sectional area. FIG. 3a shows a single cell 11 with a narrowing 7 for the MEA 4, FIG. 3b shows two such cells in series. The two dashed lines X-X show the MEA 4 of the second cell is smaller than that of the first. Such variances are intended to help manage the pressure differential observed in each cell within the stack and improve water management. Other means disclosed include varying the membranes mechanical as well as chemical and physio-chemical properties.

Referring to FIG. 4 a schematic of an MEA 4 with various constituent parts can be seen. From left to right the order is: anode GDL 45a, anode catalyst 42, anion exchange membrane 41, cathode catalyst 43, MPL 44 and cathode GDL 45c. The core components are the two catalysts, and membrane, the other components may improve functionality of the system. The MPL 44 can vary between cells to have different properties to achieve the desired outcome, such differences are not illustrated. A more hydrophobic MPL in latter cells of a stack should minimise water escaping the membrane, thereby ensuring the compressed hydrogen leaving the stack is as dry as possible.

Referring to FIG. 5, there can be seen a diagram of an electrochemical cell 21 in accordance with the present invention suitable for the compression of hydrogen, whilst also separating hydrogen from a stream of gas containing hydrogen, or as a hydrogen sensor. Firstly, the operation as a means of stripping hydrogen will be discussed.

The anode 25 of this embodiment has an inlet 22 for the introduction of a fluid stream comprising hydrogen, and an outlet 27 for the transfer of the other contaminate gases to prevent a build-up of pressure in the anodic half cell 25, the means for regulating outlet, normally a valve, on outlet 27 are not shown. When current is applied to the cell, the hydrogen will react as disclosed in earlier embodiments, whilst the remaining gases do not. This means the hydrogen crosses the AEM 24 to reach the cathodic half-cell 26 with the contaminate gases remaining in the anode 25. The hydrogen leaves the cathode 26 at an elevated pressure $P_2$. The pressure of $P_2$ may be regulated by any known pressure regulating means, such as a valve, in this and any embodiment to allow for the pressure to build.

The cell as depicted in FIG. 5 may also be used as a hydrogen sensor. In such an embodiment the gas stream, in which it is not known if hydrogen is present, is fed to the cell 21 by the inlet 22. A small voltage is applied to the cell, and if there is hydrogen present a current will be detectable. The measured current should be proportional to the partial pressure, or concentration of hydrogen within the stream. The outlet 27 in the anode allows for the removal of the other gases to prevent the undesired build of pressure due to the other contaminant gases remaining in the anode. The cathodic outlet 23 the cell adapted for the detection of hydrogen communicates hydrogen from the cell either for further compression, or other purposes. The sensor may be used merely to detect the presence of hydrogen, to inform a user of its presence, as such no compression in such an embodiment may be desired.

Referring to FIG. 6, the cell of FIG. 5, 21a can be seen with the cathodic outlet 23a being connected to the anodic inlet 22b of a second cell 21b in a stack, it should be noted more cells may be connected to allow for further compression of hydrogen. The modus operandi largely mirrors the description of other stacks, the difference being the stripping of hydrogen from a contaminated stream in cell 21a. The purified, and compressed hydrogen in the cathode 26a is communicated to the anode 25b by the outlet/inlet 23a, 22b. The cell 21b will further compress the hydrogen as it crosses the membrane 24b to the cathode 26b. It should be noted that further cells may be used in series should further compression be desired.

FIGS. 7a and 7b depict two embodiments of an alternative arrangement for an electrochemical stack. Firstly, referring to FIG. 7a, the at least two electrochemical cells 31a and 31b forming stack for the first stage of compression are connected in parallel. Hydrogen enters each anode 35a, 35b at a first pressure, and when current is applied the anodic and cathodic reactions, disclosed above occur. Hydrogen reforms in the cathode 36a and 36b, and pressure regulating means (not shown) allow for the communication of hydrogen from the cathodic outlets 33a and 33b at a second pressure. The cathodic outlets at each stage are then combined, see pipe 37, with the hydrogen at a second pressure forming the feed for the anodic inlet 32c of the cell or cells in the next compression stage. There is no limit to the number of cells in each stage, or the number of stages of compression. The pressure differential of each cell in a stage generally will be the same, but can differ between stages.

Lastly, referring to FIG. 7b there can be seen an electrochemical compressor with multiple cells, 51a and 51b forming a stage. There can be more than two cells in each stage, as discussed above. Hydrogen enters through the anodic inlets 52a 52b at a first pressure, crossing the membranes 54a and 54b via the reaction mechanism disclosed above, and reforming in the cathodes 56a 56b. Hydrogen at a second pressure is communicated from the cathodes, via cathodic outlets 53a and 53b to piping 57, the stream forming the feed for the next stage of compression. Hydrogen enters the cell in the next stage of compression 51c through the anodic inlet 52c. The cells 51a, 51b and 51c, are separated by insulating layers 58.

It should be noted that, although not shown, the feed 57 will comprise pressure regulating means and other features constituting BOP.

For clarity, in these examples cells 31a, 31b constitute a stage, and cell 31c constitutes a stage. Similarly in FIG. 7b cells 51a and 51b constitute a stage and cell 51c a stage of its own. In FIG. 2 cells 1a, 1b and 1c are each their own stage. Stages may have the same, or varying numbers of cells, dependant upon the requirements. Each stage may have 2 or more cells forming said stage.

In order to maintain a constant flowrate, the sum of current density upon the membranes of the cells in each stage will be substantially similar when the pressure differential in each cell is the same. If the cells of one stage have a higher pressure differential, then the current density will be proportionally higher to account for back flow etc. as discussed above.

The invention is not intended to be restricted to the details of any of the above described embodiments. For instance, any electrochemical compressor for hydrogen using a cell or cells with an AEM is likely to be covered by the present invention.

The method of manufacture of components within the electrochemical compressor is not intended to be a limitation upon the present invention.

Whilst the hydrogen exiting the compressor should be inherently dry, a dryer may be provided on the final outlet to ensure the hydrogen is substantially dry prior to pressurised storage.

The present invention is not intended to be limited by the catalyst used, although there is a preference for non-PGM, the membrane composition, the final pressure or any other such component.

Whilst it is envisaged a pH gradient with acidic and alkaline regions at opposing ends may occur at extreme current densities, it is preferred that the pH in the present invention is substantially 7, or higher, more preferably still substantially 9 to substantially 14 and even more preferably substantially 12 to substantially 13. In any case, the present invention is not reliant upon a pH gradient.

Whilst it is often necessary to compress hydrogen, it is envisaged that the present invention may be used for the purification of a hydrogen stream only, with no further compression desired. In such an embodiment a cell, or stack thereof, in accordance with the present invention may be used without means for pressure regulation, such as but not limited to valves, between the cells would allow for the flow of hydrogen between cells and the purification occurring therein. The means for water management disclosed aid in the drying of hydrogen. The cells as described and depicted may be configured in accordance with any of the disclosed features, ie. As a sensor, compressor, dryer or combination thereof.

Contaminants would normally remain in the first anodic half-cell. If contaminants other than water and oxygen, an outlet for the anode is preferable to prevent a build-up of pressure in the first cell. The outlet allows for the purge of water as well, in order to prevent the anode flooding.

Whilst it is envisaged that the compressed hydrogen will be used for energy storage, or in a fuel cell, alternative uses of the compressed hydrogen include refrigeration.

Whilst there can be a large number of cells in a stack, fit is not envisaged that hydrogen substantially above 1000 bar will be required. If the pressure is raised by 35 bar per cell it is envisaged each stack will have no more than 30 cells.

The present invention can be arranged in a plurality of ways, with one or more cell forming a stage of compression, each stage may be considered a stack. Such stacks may be arranged in series or parallel themselves.

The present invention allows for the simultaneous compression and drying of hydrogen without moving parts. The system is also not dependent upon an acidic environment or PGM catalysts, and has no moving parts. The system is therefore inherently more efficient than known alternatives, improving the green credentials of hydrogen.

The invention claimed is:

1. An electrochemical cell comprising:
   an anodic half-cell having an inlet configured to receive hydrogen at a first pressure;
   a cathodic half-cell having an outlet configured to transfer hydrogen at a second pressure;
   a membrane electrode assembly (MEA) separating said anodic half-cell and said cathodic half-cell; and
   a power source;
   wherein said MEA comprises at least:
   an anodic electrode;
   a cathodic electrode; and
   an anion exchange membrane (AEM) therebetween;
   wherein the AEM comprises hygroscopic particles, wherein said hygroscopic particles are arranged in a concentration gradient, the concentration thereof being higher on a cathodic side of the AEM.

2. An electrochemical cell according to claim 1, comprising at least one anodic outlet.

3. An electrochemical cell according to claim 1, further comprising pressure regulating means at any one or more of:
   the inlet of the anodic half-cell;
   the outlet of the cathodic half-cell;
   an outlet of the anodic half-cell, if present.

4. An electrochemical cell according to 3, wherein the pressure regulating means at the outlet of the cathodic half-cell is configured to, in use, maintain a gas pressure in the cathodic half-cell greater than a gas pressure in the anodic half-cell.

5. An electrochemical cell according to claim 1, wherein the MEA further comprises one or more catalysts.

6. An electrochemical cell according to claim 5, wherein the or each catalyst is not a platinum group metal.

7. An electrochemical cell according to claim 1, wherein the MEA further comprises any one or more of:
   an anodic gas diffusion layer (GDL);
   a cathodic GDL;
   a microporous layer (MPL) at the anodic and/or cathodic side;
   a water management membrane on either the anodic and/or cathodic side;
   membrane support at an anodic and/or a cathodic side.

8. An electrochemical cell according to claim 1, wherein said AEM comprises a composite membrane.

9. An electrochemical cell according to claim 1, wherein said AEM is doped with a source of OH—.

10. An electrochemical cell according to claim 1, including an ionomer on at least one of the cathodic side of the AEM and the anodic side of the AEM.

11. An electrochemical cell according to claim 1, wherein the MEA is ionomer-free and/or binder-free on at least one of an anodic or a cathodic side of said AEM.

12. An electrochemical cell according to claim 3, wherein a pressure regulating means is configured to, in use, maintain a pressure differential across the cell in the range 1-1000 bar.

13. An electrochemical cell according to claim 1, comprising a moisture sensor coupled to the outlet of said cathodic half-cell.

14. An electrochemical cell according to claim 1, comprising output means configured to be communicably coupled to an external hydrogen-fueled device for direct refuelling thereof.

15. An electrochemical cell according to claim 1, wherein, in use, during ramp down, power generated by the cell is stored.

16. An electrochemical cell according to claim 1, wherein said power source is reverse pulse.

17. A hydrogen sensor comprising an electrochemical cell according to claim 1, wherein said anodic half-cell comprises an outlet, the sensor further comprising means for applying a voltage to said cell and a current measuring means configured to measure a current through the cell as a result of said voltage being applied, a current being indicative of the presence of hydrogen in a gas stream flowing therethrough.

18. A hydrogen sensor comprising an electrochemical cell according to claim 1, wherein said anodic half-cell comprises an outlet, the sensor further comprising means for causing a current to flow through said cell and a voltage measuring means configured to measure a voltage across the cell as a result of said current being applied, a voltage being indicative of the presence of hydrogen in a gas stream flowing therethrough.

19. A hydrogen sensor comprising an electrochemical cell according to claim 1, wherein said anodic half-cell comprises an outlet, the sensor further comprising means for the passive measurement of the open circuit potential said potential being proportional to the partial pressure of the contaminant gas.

20. Apparatus for stripping hydrogen from a gaseous stream, the apparatus comprising an electrochemical cell according to claim 1, wherein said anodic half-cell is provided with an outlet configured to allow contaminate gases therein to be vented.

21. An electrochemical cell assembly comprising at least first and second electrochemical cells according to claim 1, configured in a stack, wherein the outlet of the cathodic half-cell of said first electrochemical cell is in fluid communication with the inlet of the anodic half-cell of the second electrochemical cell.

22. An electrochemical cell assembly according to claim 20, comprising a plurality of electrochemical cells according to claim 1 arranged in series as a stack, wherein the outlet of the cathodic half-cell of each electrochemical cell except the last electrochemical cell in the stack is in fluid communication with the inlet of the anodic half-cell of the immediately adjacent electrochemical cell in the in the stack, and the outlet of the cathodic half-cell of the last electrochemical cell in the stack is configured to deliver hydrogen to an external destination.

23. A method of processing a gaseous stream containing hydrogen, comprising providing an electrochemical cell according to claim 1, feeding a hydrogen-containing gaseous stream to the inlet of the anodic half-cell, and transmitting hydrogen from the outlet of the cathodic half-cell.

24. A method of processing a gaseous stream containing hydrogen, comprising providing an electrochemical cell assembly according to claim 22, feeding a hydrogen-containing gaseous stream to the inlet of the anodic half-cell of the first electrochemical cell in the stack, transferring hydrogen from the outlet of the cathodic half-cell of each electrochemical cell in the stack to the inlet of the anodic half-cell of another electrochemical cell, and delivering hydrogen from the output of the cathodic half-cell of a last electrochemical cell in the stack to an external destination.

\* \* \* \* \*